2,940,914
Patented June 14, 1960

2,940,914
SYNTHESIS OF CARBOXYLIC ACIDS

Fred W. Hoover, Pembrey, near Wilmington, Del., assignor to E. I. du Pont de Nemours and Company, Wilmington, Del., a corporation of Delaware No Drawing. Filed May 3, 1957, Ser. No. 656,754

15 Claims. (Cl. 204—154)

This invention relates to carboxylic acids and has for its principal object provision of a novel method of synthesizing such acids.

It has been reported heretofore that radiolysis of aqueous formic acid yields hydrogen and carbon dioxide as the principal products [Fricke et al., J. Chem. Phys., 6, 229 (1938)]. It has also been found that exposure of aqueous formic acid to ionizing radiation may yield other organic acids and formaldehyde as well as some hydrogen and carbon dioxide [Garrison et al., J. Am. Chem. Soc., 74, 4216 (1952)].

It is now found that formic acid, upon irradiation therewith, preferentially carboxylates C—H groups in which the carbon is not also a carbonyl carbon, i.e., not doubly-bonded to oxygen. When formic acid is mixed with a second organic compound containing a C—H group with a noncarbonyl carbon and irradiated, it consequently carboxylates the second compound preferentially to itself. This preferential reaction of formic acid with the second organic compound can be employed to provide a novel and general synthesis of carboxylic acids.

In the preferred practice of the invention, an intimate mixture of formic acid and the second compound having a carbon-hydrogen bond (usually a solution) in a mole ratio of formic acid:mole equivalent of carboxylated CH bond in the second compound in the range of about 1:3–3:1, the mixture containing no more than about 10% by weight of any third material such as water, is subjected to ionizing radiation having an energy of at least 50 electron volts, formic acid being maintained in the reaction mixture throughout the time of irradiation. The resulting carboxylated material is then generally separated from the reaction mixture.

Organic compounds suitable for carboxylation with formic acid according to the present invention are those containing at least one C–H group. With all such compounds the process of this invention produces the reaction:

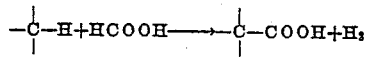

Thus, there may be employed all manner of organic compounds, such as aliphatic including cycloaliphatic, aryl aliphatic or aromatic hydrocarbons, alcohols, ethers, aldehydes, ketones, amines, nitriles and the like. Preferred compounds for carboxylation according to this invention are the hydrocarbons, i.e., alkanes, alkenes, alkynes and aromatic substituted derivatives of same, as well as aromatic hydrocarbons of the benzene, naphthalene, anthracene, etc., series. For practical purposes, organic compounds free of carboxyl groups represent another preferred group of starting materials for this invention.

Although the process is operable with all carbonaceous compounds containing the

linkage, it will generally not be applied to compounds containing more than 30 carbons, e.g., paraffin wax. In usage preferred from the standpoint of the value of the products, the carbon compounds will usually contain not more than 18 carbons.

The requirement that the composition irradiated consist at least 90% of a mixture of formic acid and the organic compound being carboxylated is based on the fact that minor amounts of extraneous materials are readily tolerated by the reaction, whereas substantial amounts (i.e., in excess of 10% by weight) of extraneous materials, particularly water, lead to excessive production of by-products, e.g., hydroxylated compounds, and are to be avoided.

The molar ratio of formic acid to the organic compound being carboxylated is restricted to the range of 3:1 to 1:3 because best yields of isolatable carboxylated derivatives are obtained when the reactants are employed in quantities not too far removed from stoichiometric values.

It is essential for the formic acid and organic compound to be in intimate contact during irradiation in the process of this invention. Since formic acid is an excellent solvent, it is most convenient to accomplish this by dissolving the organic compound in formic acid and irradiating the mixture under temperature and pressure conditions in which formic acid is liquid. However, other means for providing intimate contact may be employed. If under the conditions of irradiation the organic compound is a solid, it may be used in finely-divided form and suspended in liquid formic acid by means of suitable stirring. Gaseous organic compounds can be dispersed in liquid formic acid by vigorous agitation or by bubbling gas through the formic acid and recycling the gas.

By operating at temperatures in excess of 100° C. it is possible to employ both the formic acid and the organic compound as gases. This permits excellent contact, although formic acid is somewhat unstable under these conditions and excessively high temperatures, i.e., 200° C. and above, are to be avoided. Low temperatures, such as −100° C. and below, may be employed in this process, but, in general, ambient temperatures are satisfactory. Pressure is not a critical factor and pressures both above and below atmospheric may be employed.

Suitable ionizing radiations for use in this invention include both radiation in the form sometimes regarded as particle radiation and radiation in the form sometimes regarded as ionizing electromagnetic radiation.

By particle radiation is meant a stream of particles such as electrons, protons, neutrons, alpha-particles, deuterons, beta-particles, or the like, so directed that the said particles impinge upon the formic acid mixture. The charged particles may be accelerated by means of a suitable voltage gradient, using such devices as a cathode ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of the invention may be obtained from an atomic pile, or from radioactive isotopes or from other natural or artificial radioactive materials.

By ionizing electromagnetic radiation is meant radiation of the type produced when a metal target (e.g., tungsten) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, one may express the energy of either the particles of radiation commonly considered as particle radiation or of the photons of radiation commonly considered as wave or electromagnetic radiation in electron volts (e.v.) or million electron volts (m.e.v.). In the irradiation process of this invention, radiation consisting of particles or photons having an energy of 50 e.v. and over may be employed and particles or photons having an energy of 0.1 m.e.v. and over are preferred. With radiation of this type, carboxylation of C—H compounds with formic acid can be obtained with a minimum length of exposure to the radiation, permitting maximum efficiency in utilization of the radiation. Particles or photons with an energy equivalent of 0.5–4 m.e.v. are the most useful from a practical standpoint, although radiation with energies of 10 m.e.v. and higher may be employed.

Using a minimum dosage of at least $10^4$ rads is necessary since lower dosages do not give effective carboxylation. The rate of carboxylation usually increases with decreasing beam intensity. Dosages as high as $10^8$ to $10^9$ rads and higher may be employed. The exposure may be carried out in one slow pass, or in several faster ones and may be conducted at any convenient rate of energy input. One rad is the quantity of radiation which will result in an absorption of 100 ergs per gram of irradiated material.

The carboxylic acid produced by this invention may be isolated directly by distillation, fractional crystallization, chromatography, selective extraction with a suitable organic solvent or the like. Alternatively, the acid may be first converted to a derivative, such as a salt, ester, hydrochloride (of amino acids) or the like, and isolated in the form of the derivative by any of the usual techniques known in the art.

In the following examples parts are by weight and pressures are ambient atmospheric unless otherwise indicated.

EXAMPLE 1

A mixture of 230 g. of 98% formic acid and 230 g. of benzene was charged into a horizontal glass cylinder 59 cm. long, 45 mm. in outside diameter and 43 mm. in inside diameter. A spiral stainless steel gauze stirrer ran the length of the vessel, which was half-immersed in an ice bath. While a slow stream of nitrogen passed through the vessel and the mixture was vigorously stirred, a 500-watt beam of 2-m.e.v. electrons was impinged on the outer surface of the vessel for sixty minutes. The absorption of electronic energy by the mixture during this time was about $9 \times 10^5$ watt-second. Material volatile at 45°/20 mm. was then removed by distillation, leaving 13.3 g. of thick brown oil. The oil was taken up in chloroform, the chloroform was extracted with dilute aqueous sodium hydroxide, and the alkaline extract was acidified and extracted several times with chloroform. The chloroform extract was dried, concentrated to a small volume by distillation, and chromatographed on silicic acid by the procedure of Marvel and Rands, J. Am. Chem. Soc., 72, 2642–6 (1950). By means of the chromatography, 0.10 g. of benzoic acid was isolated. It was identified by conversion to p-bromophenacyl benzoate, M.P. 120–121° C. both alone and when mixed with an authentic sample.

EXAMPLE 2

A mixture of 98 g. of 98% formic acid and 62.3 g. of cyclohexane was irradiated in the apparatus described in Example 1 using a 500-watt beam of 2-m.e.v. electrons for 60 minutes. The absorption of electronic energy by the mixture during this time was about $2 \times 10^5$ watt-seconds. The product was worked up by distillation and chromatography as in Example 1, and 0.065 g. of cyclohexanecarboxylic acid was isolated. It was identified by the melting point (91–92° C.) and infrared absorption spectrum of its p-bromophenacyl ester, both of which were identical with those of authentic p-bromophenacyl cyclohexanecarboxylate.

EXAMPLE 3

A mixture of 40 ml. of 88% formic acid and 25 g. of paraffin wax was spread in a glass dish one inch deep and covered with aluminum foil. The mixture was then irradiated with 2-m.e.v. electrons through the foil until 1650 watt-sec. of energy was absorbed by the mixture. The product was dissolved in cyclohexane. The infrared absorption spectrum of this solution showed that carboxyl groups had been introduced on the paraffin chains.

In the following table, section A shows organic compounds which when irradiated in the presence of formic acid yield the indicated carboxylic acid product, as in Examples I and II. Section B shows compounds which when irradiated in the presence of formic acid yield a mixture of the two indicated carboxylic acid products. Section C shows compounds which yield 3 or more isomeric carboxylic acid products as in Example 3. The isomers may be separated, if desired, by methods known in the art.

Table

| Compound Irradiated with Formic Acid | Carboxylic Acid Product(s) |
|---|---|
| Section A: | |
| methane | acetic acid. |
| ethane | propionic acid. |
| neopentane | 3,3-dimethylbutyric acid. |
| methyl alcohol | glycolic acid. |
| methyl chloride | chloroacetic acid. |
| methyl fluoride | fluoroacetic acid. |
| methylamine | glycine. |
| trimethylamine | N,N-dimethylglycine. |
| acetonitrile | cyanoacetic acid. |
| Section B: | |
| propane | butyric acid and isobutyric acid. |
| isobutane | pivalic acid and isovaleric acid. |
| naphthalene | α-naphthoic acid and β-naphthoic acid. |
| ethyl alcohol | lactic acid and hydracrylic acid. |
| isopropyl alcohol | α-hydroxyisobutyric acid and 3-hydroxybutyric acid. |
| diethyl ether | 2-ethoxypropionic acid and 3-ethoxypropionic acid. |
| ethyl bromide | 2-bromopropionic acid and 3-bromopropionic acid. |
| diethyl sulfide | 2-ethylthiopropionic acid and 3-ethylthiopropionic acid. |
| methyl acetate | monomethyl ester of malonic acid and acetoxyacetic acid. |
| Section C: | |
| heptane | octanoic acid and isomers. |
| propylene | vinylacetic acid and isomers. |
| toluene | phenylacetic acid and toluic acids. |
| 1-hexyne | 2-ethynylvaleric acid and isomers. |
| phenylacetylene | p-ethynylbenzoic acid and isomers. |
| 2,4,4-trimethylpentanol | 2-hydroxy-3,5,5-trimethylcaproic acid and isomers. |
| benzyl alcohol | mandelic acid and isomers. |
| dibenzyl ether | α-benzyloxy-p-toluic acid and isomers. |
| propyl iodide | 2-iodobutyric acid and isomers. |
| chlorobenzene | p-chlorobenzoic acid and isomers. |
| 1-bromonaphthalene | 1-bromo-4-naphthoic acid and isomers. |
| benzyl chloride | chlorophenylacetic acid and isomers. |
| benzaldehyde | p-formylbenzoic acid and isomers. |
| 4-heptanone | 4-heptanone-1-carboxylic acid and isomers. |
| benzophenone | 4-benzophenonecarboxylic acid and isomers. |
| piperidine | piperidine-2-carboxylic acid and isomers. |
| morpholine | morpholine-2-carboxylic acid and isomers. |
| N,N-dimethylaniline | 4-dimethylaminobenzoic acid and isomers. |
| benzonitrile | p-cyanobenzoic acid and isomers. |
| phenylacetonitrile | 2-cyano-2-phenylacetic acid and isomers. |
| nitrobenzene | m-nitrobenzoic acid and isomers. |

Since obvious modifications in the invention will occur to those skilled in the chemical arts, I propose to be bound solely by the appended claims.

The embodiments of the invention in which an exclusive property or privilege is claimed are defined as follows:

1. In the synthesis of a carboxylic acid, the steps comprising (1) intimately mixing a first compound containing a carbon-hydrogen bond, said carbon being noncarbonyl, with the second compound formic acid and (2)

irradiating the resulting mixture with at least $10^4$ rads of ionizing radiation having a minimum intensity of 50 electron volts at a temperature between about $-100°$ and $+200°$ C.

2. The invention of claim 1 in which the carbon attached to the hydrogen possesses no double bond other than a double bond to another carbon.

3. In the synthesis of a carboxylic acid, the steps comprising (1) intimately mixing a hydrocarbon with formic acid and (2) irradiating the resulting mixture with at least $10^4$ rads of ionizing radiation having a minimum intensity of 50 electron volts at a temperature between about $-100°$ and $+200°$ C.

4. The invention of claim 3 in which the hydrocarbon is aliphatic.

5. The invention of claim 3 in which the hydrocarbon is cycloaliphatic.

6. The invention of claim 3 in which the hydrocarbon is aromatic.

7. The method of replacing with a carboxyl group a hydrogen atom on a carbon atom joined thereto but free of double-bonded connection with oxygen which comprises irradiating the compound containing said carbon atom with at least $10^4$ rads of ionizing radiation having a minimum intensity of 50 electron volts in admixture with formic acid at a temperature between about $-100°$ and $+200°$ C.

8. The invention of claim 1 wherein said first compound contains no more than 30 carbons.

9. The invention of claim 1 wherein said first compound contains no more than 18 carbons.

10. The invention of claim 3 wherein the hydrocarbon contains no more than 30 carbons.

11. The invention of claim 3 wherein the hydrocarbon contains no more than 18 carbons.

12. The invention of claim 7 wherein the compound containing said carbon atom contains no more than 30 carbons.

13. The invention of claim 7 wherein the compound containing said carbon atom contains no more than 18 carbons.

14. The process of producing benzoic acid which comprises irradiation with at least $10^4$ rads of ionizing radiation having a minimum intensity of 50 electron volts an intimate admixture of formic acid and benzene at a temperature between about $-100°$ C. and $+200°$ C.

15. The process of producing cyclohexanecarboxylic acid which comprises irradiating with at least $10^4$ rads of ionizing radiation having a minimum intensity of 50 electron volts an intimate admixture of formic acid and cyclohexane at a temperature between about $-100°$ C. and $+200°$ C.

References Cited in the file of this patent

UNITED STATES PATENTS 2,823,216     Moote et al.     Feb. 11, 1958